Patented June 6, 1950

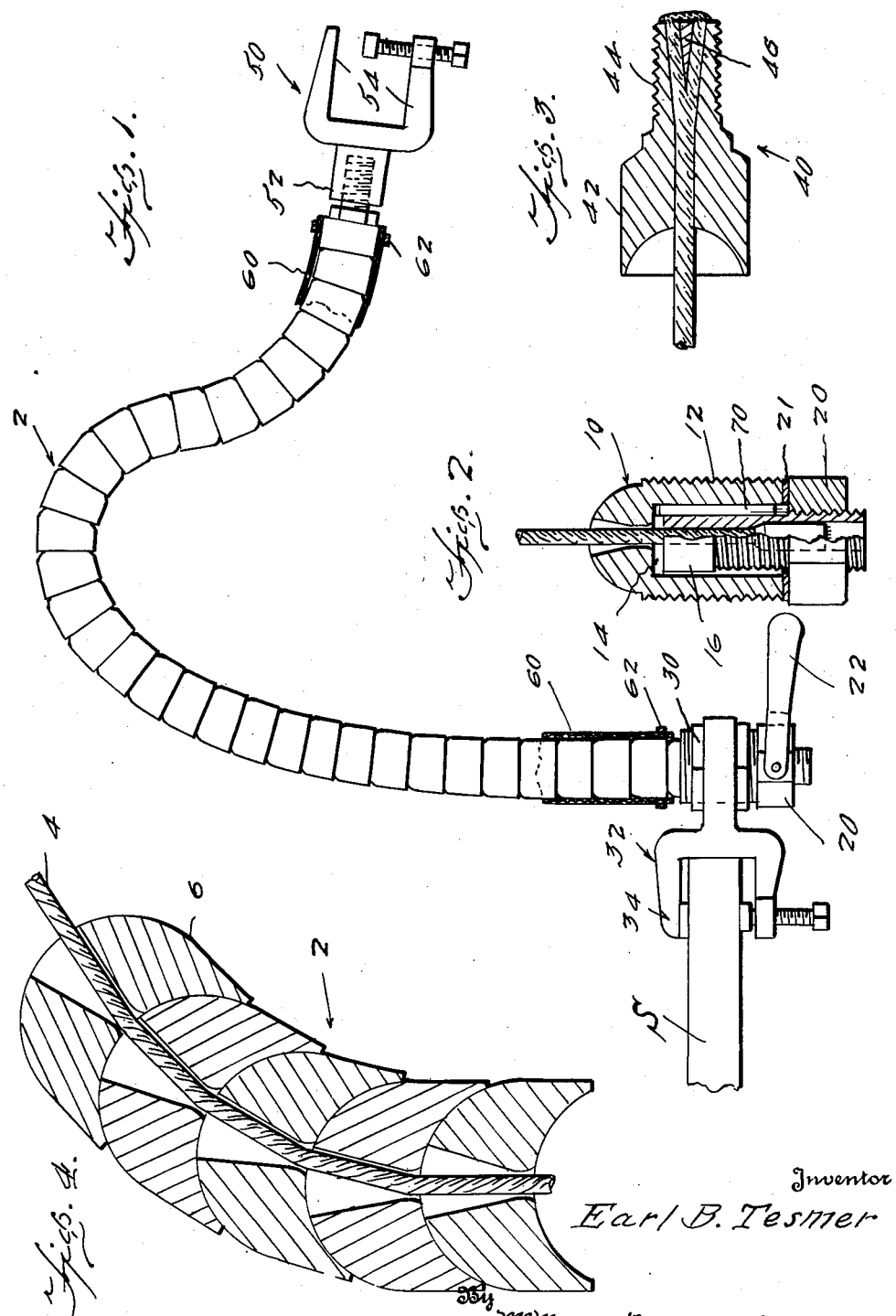

2,510,198

UNITED STATES PATENT OFFICE 2,510,198

FLEXIBLE POSITIONER

Earl B. Tesmer, Seattle, Wash.

Application October 17, 1947, Serial No. 780,506

2 Claims. (Cl. 248—226)

This invention relates to an improved so-called flexible positioner capable of properly and easily positioning a tool, and releasably locking the same in the desired position once attained. As will appear, the device is particularly adapted for use in intricate assembly work, such as in aircraft manufacture, for example, where there frequently are places which are difficult to operate upon with any degree of efficiency.

It is a principal object of this invention to provide a flexible positioning device capable of facilitating such operations as welding, brazing, soldering, and so forth, commonly encountered in assembly repair or adjusting work in connection with the manufacture of items of various description. As will be later described, the device includes a flexible cable having unique means whereby one end thereof may be clamped to a supporting or stationary object, and the other end thereof may releasably clamp the actual operating tool.

A further object of the invention is the provision of a flexible positioner so constructed that the tension in the cable may be adjusted to such an extent that it may be rendered rigid once the operating tool itself has been properly positioned. This, of course, is in order that the proper position once achieved may be retained and not inadvertently altered.

Various other objects and advantages of the invention will become more apparent after a reading of the following description, wherein reference will be had to the accompanying drawings.

The figures are as follows:

Figure 1 is a side elevational view with the device of the invention shown in association with a supporting object.

Figure 2 is a fragmentary sectional view of the supported end of the device of the invention.

Figure 3 is a detail view in section of the tool-holding end of the device.

Figure 4 is an enlarged detail view in section of a portion of the cable proper.

Referring now to the drawings more in detail, the invention will be fully described.

The cable, indicated generally by the numeral 2, includes a body part 4 and a plurality of socketed segment parts 6. The body part 4 preferably consists of a continuous length of wire or cable and the segments 6, which are substantially spherical, as shown, surround the part 4 and are disposed thereon in such mated relationship that the cable may be bent into any desired configuration.

The lowermost segment of the cable, which means that segment which is nearest the supported end thereof, is indicated generally by 10. This has an exteriorly-threaded lower end portion 12, as shown, and is also provided with an upwardly-extending socket 14 which is in communication with the hole through the upper portion of the socketed segment 10, which hole is, of course, in communication with the communicating holes of all the successive segments through which body part 4 extends.

Disposed within the socket 14 is a bolt member 16 which has its lower end at least exteriorly threaded, and this said lower end projects downwardly below the lower end of segment 10. A nut member 20 is threaded onto this lower end part of 16 and there is preferably provided manual means 22 for facilitating rotation of nut 20 in order to bring about upward and downward movement of the bolt with respect to segment 10.

Another nut member 30 is threaded on part 12 in a plane above nut 20. This member 30 has associated therewith a forked clamping member, indicated generally by the numeral 32 and of more or less conventional construction. Arms 34 thereof are adapted to engage opposite sides of an object, such as S, and an ordinary thumb screw 36 may be utilized to hold the member 32 in clamping engagement.

The opposite end segment of the cable C is indicated generally by the numeral 40 and is shown in detail, in Figure 3. The body portion 42 of segment 40 is substantially the same in structure as the other segments, but it has a forwardly-extending clamp-engaging portion 44 which is threaded exteriorly as shown. The forward end portion of the cable C, of course, extends through the socket of segment 40.

The forward end portion 44 of the end segment is preferably provided with a conically-shaped hole, as shown in Figure 3, for receiving the complementally-shaped end portion of the cable C. The latter is provided with a conically-shaped hole, and this is adapted to receive a tapered wedge member 46 which is shaped complemental to the said hole in the end portion of the cable C. In this way it will be appreciated that the cable and end segment are readily but firmly secured in place.

A clamping device, indicated generally by the numeral 50, has a rearwardly-extending, interiorly-threaded socket portion 52 for engaging part 44 of member 40 and forked arms 54 similar to the clamping arms 34 at the other end of the cable. These may be, of course, a thumb screw 56, or the like, to accomplish the usual clamping function.

As a further feature of the invention, there may be provided a protective sleeve 60 around the mated segments in order to protect the joints from foreign material. Such a sleeve may be attached to each end segment, as by a metallic band 62, and is, naturally, of such material that it fits loosely over the entire length of the cable so as not to interfere with its flexibility.

If desired, the lower portion of the bore of bolt 16 may be enlarged to receive a suitable sleeve on the lower end portion of cable 4, as shown in Figure 2, and there may or may not be a washer 21 disposed between the lower side of the segment 10 and the nut member 20. In any event, as will be obvious, the construction is such that rotation of nut member 20 in one direction or the other is adapted to adjust the tension of cable member 4 within the mated socket-like segments and locked in either tightened or relatively rigid or relatively unflexed positions.

Also, according to the preferred form of the invention, there is a dowel key member 70 which is disposed within socket or recess 14, and this is arranged to keep the bolt 16 from unwanted turning therein while the nut member 20 is being rotated to bring about, or release, tension on cable C.

It may be stated that, with reference to Figure 3, the forward end portion of the cable may be of larger diameter with respect to the rest of the cable C and then when received in the conically shaped hole of the end segment, the tapered wedge member 46 above referred to may forcibly be driven into its substantially central portion and then the wedge may be guaranteed against removal by welding or solder or the like, as indicated.

From the foregoing description and a study of the drawings, it will be apparent that I have provided a new construction. It is, of course, to be understood that I reserve the right to make such changes in the form, construction, and arrangement of parts as will not depart from the spirit of the invention or the scope of the appended claims.

I claim:

1. A flexible positioner of the class described comprising in combination, a main body part consisting of a continuous length of flexible material having a plurality of hollow and mated segments surrounding the same and forming a main body member, a nut member rotatable on the body member, a clamp member associated with one of the endmost segments adapted to releasably secure said body member with respect to a desired supporting surface, said one endmost segment being provided with a recess, a tensioning bolt member extending into said recess and engaging said wire, and a key member disposed in said recess adapted to prevent rotation of said bolt member while said nut member is being rotated.

2. A flexible positioner, comprising a flexible cable, a plurality of hollow and mated segments mounted upon the cable and forming with the cable a flexible body member, an end segment mounted upon the cable and associated with the first-named segments and provided with a recess forming a socket, the end segment having an externally screw-threaded portion, a nut carried by the externally screw-threaded portion, a clamp member mounted upon the nut and adapted to detachably secure the flexible positioner to a fixed support, a screw-threaded bolt disposed within the socket and attached to the cable, a nut mounted upon the screw-threaded bolt and engaging the end of the end segment and turnable to tension or relax the cable, and means to prevent the bolt from turning within the socket.

EARL B. TESMER.

REFERENCES CITED

The following references are of record in the file of this patent:

UNITED STATES PATENTS

| Number | Name | Date |
|---|---|---|
| 688,230 | Isgrig et al. | Dec. 3, 1901 |
| 870,429 | Grimler | Nov. 5, 1907 |
| 2,110,037 | De Rosa | Mar. 1, 1938 |

FOREIGN PATENTS

| Number | Country | Date |
|---|---|---|
| 9,476 | Great Britain | May 11, 1893 |